United States Patent
Paniccia (10) Patent No.: US 6,374,020 B1
(45) Date of Patent: Apr. 16, 2002

(54) METHOD AND APPARATUS FOR OPTICALLY INTERCONNECTING A PLURALITY OF DEVICES

(75) Inventor: Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/438,345

(22) Filed: Nov. 11, 1999

(51) Int. Cl.[7] .............................. G02B 6/42; G02B 6/43
(52) U.S. Cl. ............................. 385/47; 385/24; 385/36; 385/18; 359/117
(58) Field of Search .................................. 359/113, 117, 359/124, 127, 128, 130; 385/16–19, 24, 31, 33, 36, 47

(56) References Cited

U.S. PATENT DOCUMENTS

| | | | | |
|---|---|---|---|---|
| 4,234,969 A | * | 11/1980 | Singh | 359/164 |
| 5,245,680 A | * | 9/1993 | Sauter | 385/24 |
| 5,619,359 A | * | 4/1997 | Redmond et al. | 359/117 |
| 5,954,820 A | * | 9/1999 | Hetzler | 713/323 |
| 5,999,313 A | * | 12/1999 | Fukushima | 359/484 |
| 6,199,148 B1 | * | 3/2001 | Naito | 711/163 |
| 6,212,313 B1 | * | 4/2001 | Li | 385/24 |

FOREIGN PATENT DOCUMENTS

| | | |
|---|---|---|
| EP | 0 901 023 A | 11/1998 |
| GB | 2 093 304 A | 8/1982 |
| JP | 58 079 347 | 5/1983 |
| JP | 59 177 517 | 3/1984 |

OTHER PUBLICATIONS

Song S H et al: "Planar Optical Configurations for Crossover Interconnects" Optics Letters, US, Optical Society of America, Washington, vol. 20, No. 6, Mar. 15, 1995, pp. 617–619.

International Search Report for International Application No. PCT/US 00/26808, Jan. 4, 2001.

* cited by examiner

*Primary Examiner*—Hemang Sanghavi
*Assistant Examiner*—Omar Rojas, Jr.
(74) *Attorney, Agent, or Firm*—Blakely, Sokoloff, Taylor & Zafman LLP (57) ABSTRACT

A device for optically interconnecting a plurality of devices. In one embodiment, the disclosed optical interconnection device includes a plurality of optical ports. One embodiment of the presently described optical interconnection device includes optics elements to optically couple each one of the optical ports to one another. In one embodiment, these optical elements include one or more beam splitters and deflectors. Each of the optical ports of the presently described optical interconnection device is configured to be optically coupled to another device, such as for example an integrated circuit chip, computer system or the like, through an optical link. In one embodiment, the optical ports accommodate a plurality of N optical beams providing an N-bit wide multi-load optical bus.

26 Claims, 6 Drawing Sheets

METHOD AND APPARATUS FOR OPTICALLY INTERCONNECTING A PLURALITY OF DEVICES

BACKGROUND OF THE INVENTION

1. Field of the Invention

The present invention relates generally to the interconnecting signals between devices and, more specifically, the present invention relates to optical interconnections among a plurality of devices.

2. Background Information

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and a large amount of on-die decoupling capacitance to provide a means of noise suppression, dissipate more heat and occupy more of the valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based metal oxide semiconductor (MOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar based transistor. One consequence of this is slow speed, for example up to several hundred megahertz, and very high power consumption, for example 10 mW or more for a single switch. In order to increase the modulation depth, one often tries to obtain a large interaction volume between the injected charge and the optical beam. This is generally accomplished by making very long waveguides, for example on order of thousands of microns, thereby increasing the interaction length through which the optical beam travels. As can be appreciated to those skilled in the art, actual incorporation of SOI waveguides into existing multi-layer standard MOS based processing however is not straight forward. Hence, utilization of these waveguide structures becomes quite impractical when used for high speed input/output in large transistor count microprocessors.

As integrated circuit speeds continue to increase, there is also a need to increase bus speeds between integrated circuit chips. Present day shared electrical buses are being pushed to the electrical limits. It is becoming increasingly difficult for present-day multi-load electrical buses to keep up with the bandwidth requirements needed for future, and some present-day, high-speed integrated circuit chips. Consequently, some bus designers are being forced to consider point-to-point electrical interconnections instead of multi-load electrical buses for high-speed integrated circuit chip and/or computer system applications.

SUMMARY OF THE INVENTION

An apparatus and method for optically interconnecting a plurality of devices are disclosed. In one embodiment, the method for optically interconnecting the plurality of devices includes splitting a first optical signal beam received from a first device and optically coupling a second device and a third device to receive the first optical signal beam. The method also includes splitting a second optical signal beam received from the second device and optically coupling the first device and the third device to receive the second optical signal beam. The method further includes splitting a third optical signal beam received from the third device and optically coupling the first device and the second device to receive the third optical signal beam. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for optically interconnecting a plurality of devices is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, the present invention provides an optical interconnection device that provides a multi-load optical bus for a plurality of devices such as for example integrated circuit chips including central processing units (CPUs), memory chips, etc., computer servers, computer systems or the like. In one embodiment, the devices coupled to the optical interconnection device of the present invention include electro-optical converters to convert electrical signals to optical signals and optical signals to electrical signals. In one embodiment, the optical interconnection device of present invention includes a plurality of ports, each of which is optically coupled to all of the other ports of the optical interconnection device. Thus, an optical signal beam received on the first port is transmitted to all of the other ports. Conversely, an optical signal beam received on any of the other ports is transmitted to the first port.

Figure 1:
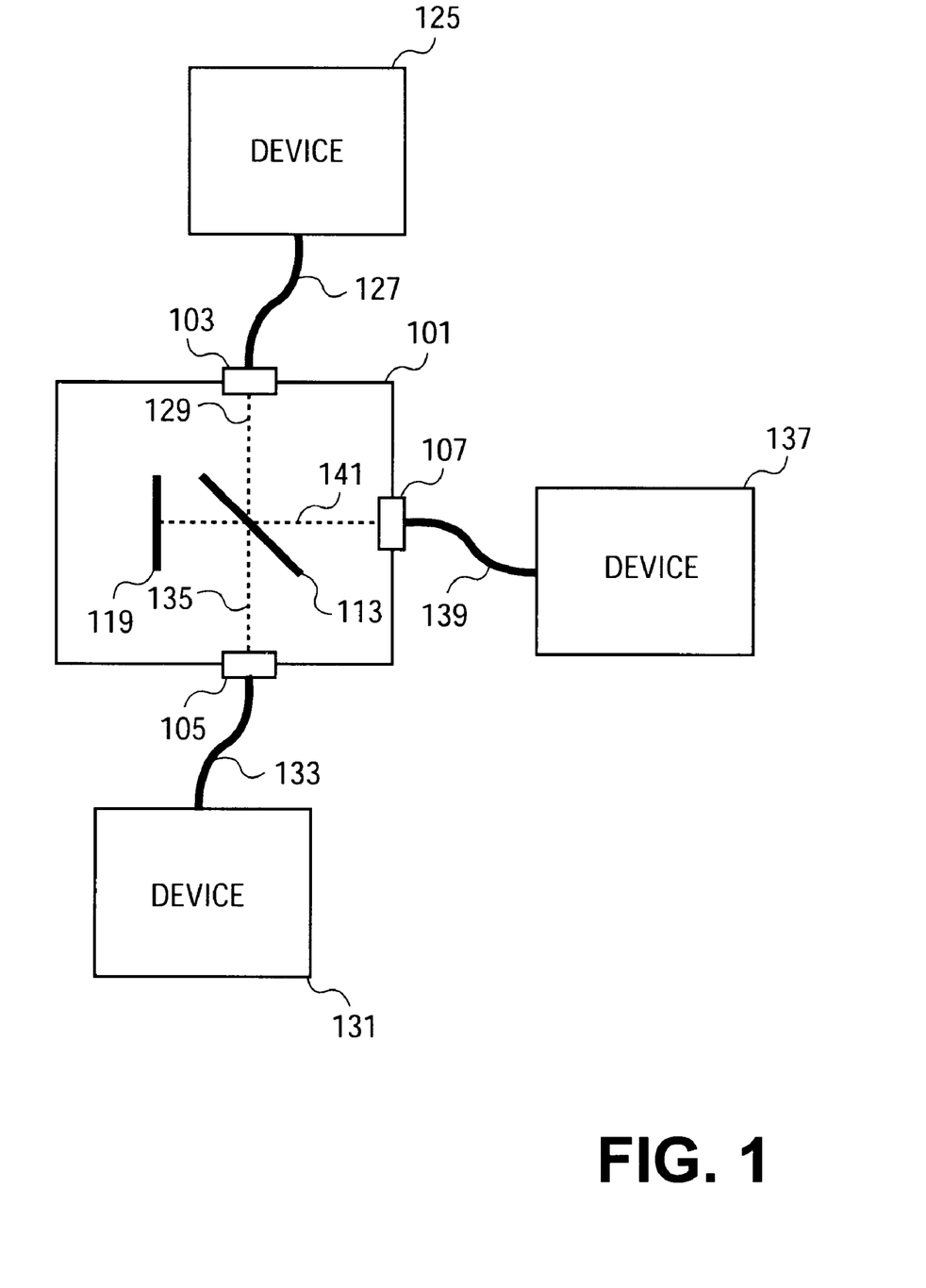
FIG. 1 is an illustration of one embodiment of an optical interconnection device optically coupling a plurality of devices in accordance with the teachings of the present invention.

To illustrate, FIG. 1 is an illustration of one embodiment of an optical interconnection device 101 optically coupling a plurality of devices 125, 131 and 137 in accordance with the teachings of the present invention. As shown, optical interconnection device 101 includes a plurality of ports 103, 105 and 107. In one embodiment, ports 103, 105 and 107 are optically coupled to one another. In the embodiment depicted, device 125 is optically coupled to port 103 through optical link 127. Similarly, device 131 is optically coupled to port 105 through optical link 133 and device 137 is optically coupled to port 107 through optical link 139. In one embodiment, optical links 127, 133 and 139 include optical fibers or the like.

In one embodiment, devices 125, 131 and 137 are integrated circuit chip devices such as for example but not limited to central processing units (CPUs), memory chips, chip sets or the like. In another embodiment, devices 125, 131 and 137 may be computer systems, computer servers, or other types of devices that communicate with other devices. In one embodiment, devices 125, 131 and 137 include electro-optical converters (not shown) that convert internal electrical signals to optical signals that are to be transmitted to optical interconnection device 101. Examples of electro-optical converters include optical modulators and demodulators utilizing the laser diodes, diffractive optics, fiber modules and the like. In one embodiment, the electro-optical converters convert optical signals received from optical interconnection device 101 to electrical signals. In another embodiment, electro-optical converters are not included in those devices 125, 131 and/or 137 that do not utilize electrical signals internally.

In one embodiment, optical interconnection device 101 includes optics elements such that ports 103, 105 and 107 are optically coupled to one another. In the embodiment depicted in FIG. 1, optical interconnection device 101 includes optics elements 113 and 119. In one embodiment, optics element 113 is a beam splitter and optics element 119 is a deflector. In another embodiment, optical interconnection device 101 may also include glass, silicon or the like etched in grooves, diffractive optics, polymer waveguides, or the like to optically couple ports 103, 105 and 107 to one another.

As shown in the embodiment depicted in FIG. 1, an optical signal beam 129 is transmitted from device 125 through port 103. Optical signal beam 129 is directed to and split by optics element 113. One portion of optical signal beam 129 passes through the optics element 113 to port 105 to device 131. Another portion of optical signal beam 129 is deflected to port 107 to device 137.

In one embodiment, an optical signal beam 135 is transmitted from device 131 through port 105. Optical signal beam 135 is directed to and split by optics element 113. One portion of optical signal beam 135 passes through the optics element 113 to port 103 to device 125. Another portion of optical signal beam 135 is deflected to optics element 119. That portion is deflected back to optics element 113, through which a portion is directed to port 107 to device 137.

In one embodiment, an optical signal beam 141 is transmitted from device 137 through port 107. Optical signal beam 141 is directed to and split by optics element 113. One portion of optical signal beam 135 is deflected to port 103 to device 125. Another portion of optical signal beam 135 passes through the optics element 113 to optics element 119. That portion is deflected back to optics element 113, through which a portion is deflected to port 105 to device 131.

Thus, devices 125, 131 and 137 are optically coupled to one another through optical interconnection device 101 in accordance with the teachings of the present invention. In an embodiment in which devices 125, 131 and 137 include for example CPUs, it is appreciated that the presently described optical interconnection device 101 provides a multi-load optical bus that interconnects the CPUs. Prior optical links are point-to-point links. Existing multi-load or shared electrical buses do not have the architecture to operate using point to point links. Thus, optically interconnecting multiple present day CPUs with known point-to-point optical links is not a simple task since one would have to have a new architecture for the CPUs in order to enable a point-to-point based architecture. This of course would make it difficult for the architecture to be backwards compatible with present day microprocessor technology. One embodiment of the presently described optical interconnection device 101 allows one to optically interconnect multiple processors or CPUs in such a way that the configuration is similar to that found in shared electrical or multi-load buses. Thus, the present invention allows one to take advantage of the benefits provided with optical interconnections, while preserving a multi-load or shared electrical bus type architecture.

Figure 2:
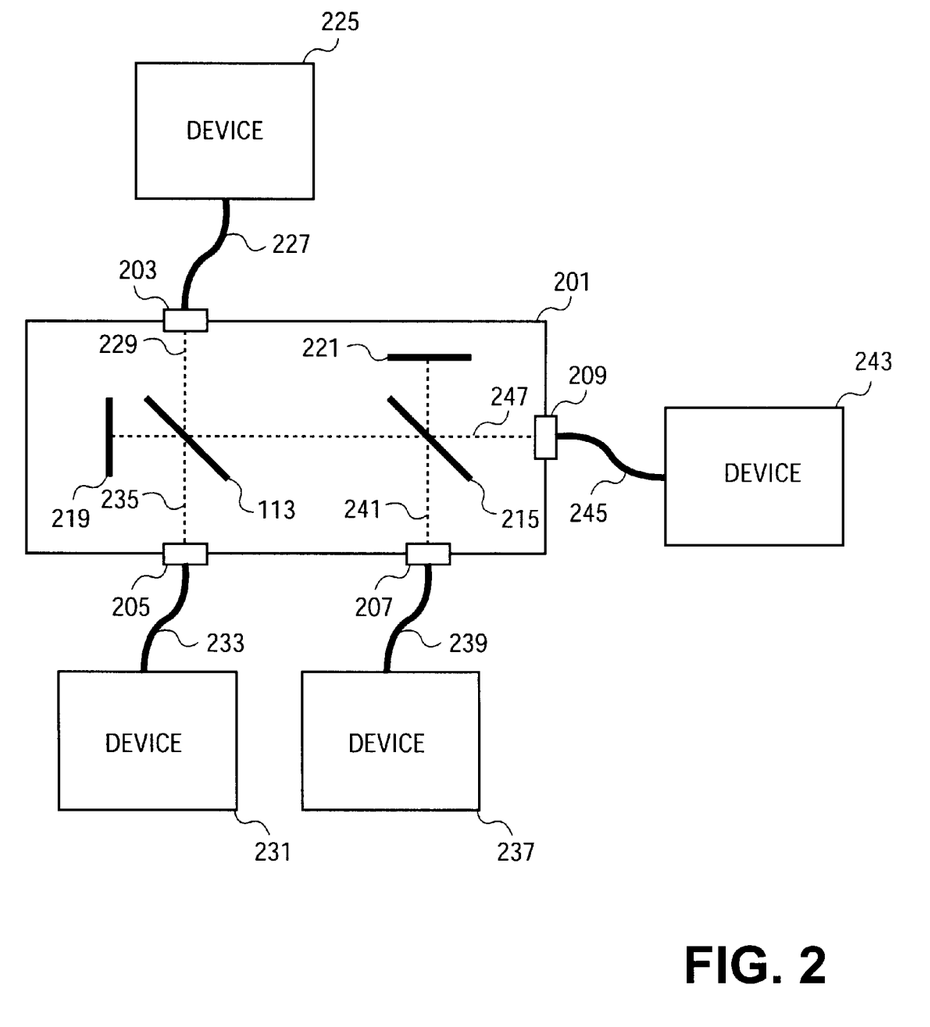
FIG. 2 is an illustration of another embodiment of an optical interconnection device optically coupling a plurality of devices in accordance with the teachings of the present invention.

FIG. 2 is an illustration of another embodiment of an optical interconnection device 201 optically coupling a plurality of devices 225, 231, 237 and 243 in accordance with the teachings of the present invention. As shown, optical interconnection device 201 includes a plurality of ports 203, 205, 207 and 209. In one embodiment, ports 203, 205, 207 and 209 are optically coupled to one another. In the embodiment depicted, device 225 is optically coupled to port 203 through optical link 227. Similarly, device 231 is optically coupled to port 205 through optical link 233, device 237 is optically coupled to port 207 through optical link 239 and device 243 is optically coupled to port 209 through optical link 245. In one embodiment, optical links 227, 233, 239 and 245 include optical fibers or the like.

As in the embodiment discussed above in FIG. 1, devices 225, 231, 237 and 243 may be CPUs, memory chips, chip sets, computer servers, computer systems or other types of devices that communicate with other devices. In one embodiment, devices 225, 231, 237 and 243 include electro-optical converters (not shown) that convert internal electrical signals to optical signals and vice versa.

In one embodiment, optical interconnection device 201 includes optics elements such that ports 203, 205, 207 and 209 are optically coupled to one another. In the embodiment depicted in FIG. 2, optical interconnection device 101 includes optics elements 213, 215, 219 and 221. In one embodiment, optics elements 213 and 215 are beam splitters and optics elements 219 and 221 are deflectors.

As shown in the embodiment depicted in FIG. 2, an optical signal beam 229 is transmitted from device 225 through port 203. Optical signal beam 229 is directed to and split by optics element 213. One portion of optical signal beam 229 passes through the optics element 213 to port 205 to device 231. Another portion of optical signal beam 229 is deflected to optics element 215. A portion of the optical signal beam 229 is deflected to port 207 to device 237. Another portion optical signal beam 229 passes through optics element 215 to port 209 to device 243.

In one embodiment, an optical signal beam 235 is transmitted from device 231 through port 205. Optical signal beam 235 is directed to and split by optics element 213. One portion of optical signal beam 235 passes through the optics element 213 to port 203 to device 225. Another portion of optical signal beam 235 is deflected to optics element 219. That portion is deflected back to optics element 213, through which a portion is directed to optics element 215. A portion of optical signal beam 235 is deflected to port 207 to device 237. Another portion of optical signal beam 235 passes through optics element 215 to port 209 to device 243.

In one embodiment, an optical signal beam 241 is transmitted from device 237 through port 207. Optical signal beam 241 is directed to and split by optics element 215. One portion of optical signal beam 241 is deflected to optics element 213, where one portion is deflected to port 203 to device 225 and another portion is deflected from optics element 219 back to optics element 213 to which a portion is directed to port 205 to device 231. Another portion of optical signal beam 241 passes through the optics element 215 to optics element 221. That portion is deflected back to optics element 215, through which a portion is deflected to port 209 to device 243.

In one embodiment, an optical signal beam 247 is transmitted from device 243 through port 209. Optical signal beam 247 is directed to and split by optics element 215. One portion of optical signal beam 247 is deflected to optics element 221. That portion is deflected back to optics element 215, through which a portion is directed to port 207 to device 237. Another portion of optical signal beam 247 passes through the optics element 215 to optics element 213 where one portion is deflected to port 203 to device 225 and another portion is deflected from optics element 219 back to optics element 213 to which a portion is directed to port 205 to device 231.

Thus, devices 225, 231, 237 and 243 are optically coupled to one another through optical interconnection device 201 in accordance with the teachings of the present invention.

Figure 3:
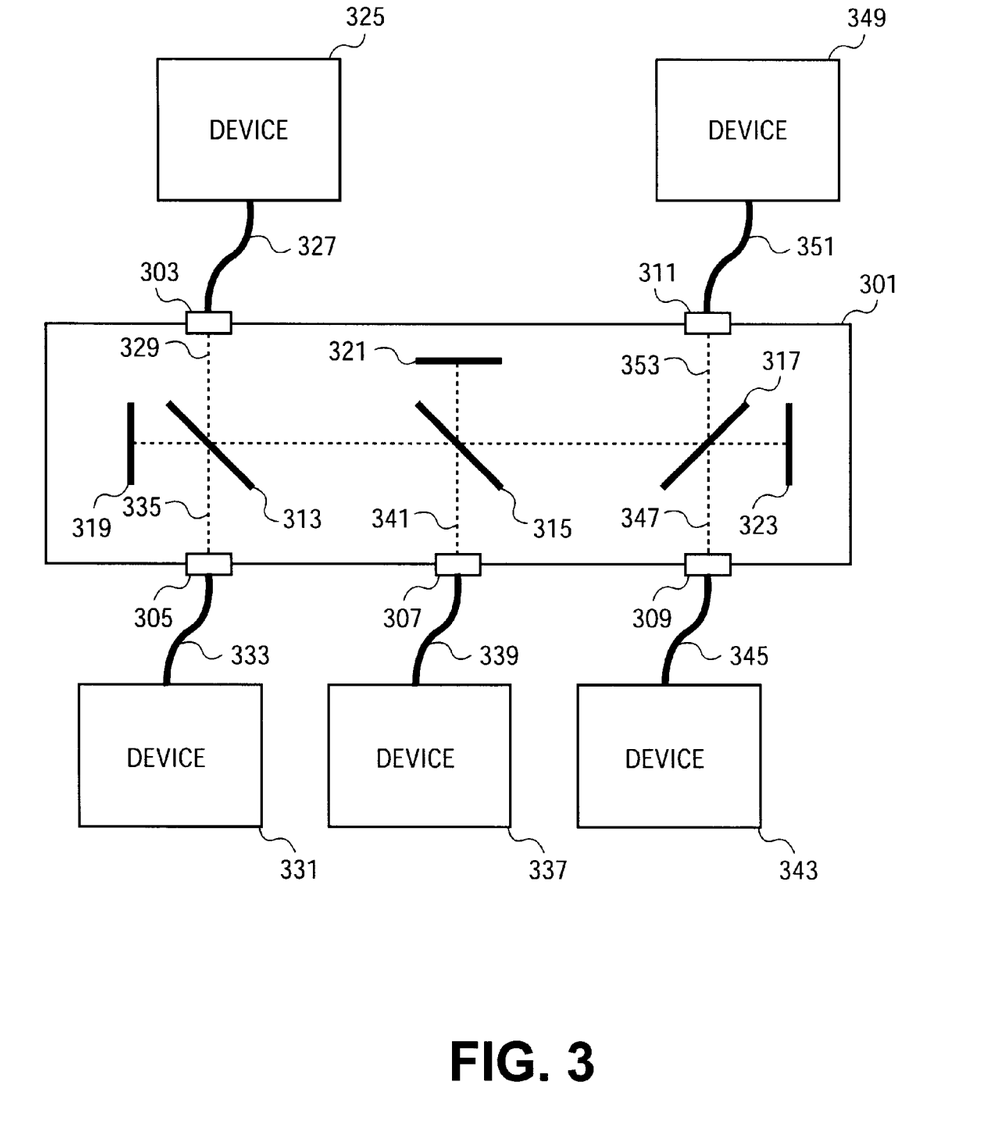
FIG. 3 is an illustration of yet another embodiment of an optical interconnection device optically coupling a plurality of devices in accordance with the teachings of the present invention.

FIG. 3 is an illustration of yet another embodiment of an optical interconnection device 301 optically coupling a plurality of devices 325, 331, 337, 343 and 349 in accordance with the teachings of the present invention. As shown, optical interconnection device 301 includes a plurality of ports 303, 305, 307, 309 and 311. In one embodiment, ports 305, 307, 309 and 311 are optically coupled to one another. In the embodiment depicted, device 325 is optically coupled to port 303 through optical link 327. Device 331 is optically coupled to port 305 through optical link 333 and device 337 is optically coupled to port 307 through optical link 339. Similarly, device 343 is optically coupled to port 309 through optical link 345 and device 349 is optically coupled to port 311 through optical link 351. In one embodiment, optical links 327, 333, 339, 245 and 351 include optical fibers or the like.

As in the embodiments discussed above in FIGS. 1 and 2, devices 325, 331, 337, 343 and 349 may be CPUs, memory chips, chip sets, computer servers, computer systems or other types of devices that communicate with other devices.

In one embodiment, devices 325, 331, 337, 343 and 349 include electro-optical converters (not shown) that convert internal electrical signals to optical signals and vice versa.

In one embodiment, optical interconnection device 301 includes optics elements such that ports 303, 305, 307, 309 and 311 are optically coupled to one another. In the embodiment depicted in FIG. 3, optical interconnection device 301 includes optics elements 313, 315, 317, 319, 321 and 323. In one embodiment, optics elements 313, 315 and 317 are beam splitters and optics elements 319, 321 and 323 are deflectors.

As shown in the embodiment depicted in FIG. 3, an optical signal beam 329 is transmitted from device 325 through port 303. Optical signal beam 329 is directed to and split by optics element 313. One portion of optical signal beam 329 passes through optics element 313 to port 305 to device 331. Another portion of optical signal beam 329 is deflected to optics element 315. A portion of the optical signal beam 329 is deflected to port 307 to device 337. Another portion optical signal beam 329 passes through optics element 315 to optics element 317. A portion of optical signal beam 329 is deflected from optics element 317 to port 311 to device 349. Another portion of optical signal beam 329 passes through optics element 317 and is then deflected from optics element 323 back to optics element 317. A portion of optical signal beam 329 is then deflected to port 309 to device 343.

In one embodiment, an optical signal beam 335 is transmitted from device 331 through port 305. Optical signal beam 335 is directed to and split by optics element 313. One portion of optical signal beam 335 passes through the optics element 313 to port 303 to device 325. Another portion of optical signal beam 335 is deflected to optics element 319. That portion is deflected back to optics element 313, through which a portion is directed to optics element 315. A portion of optical signal beam 335 is deflected to port 307 to device 337. Another portion of optical signal beam 335 passes through optics element 315 to optics element 317. A portion of optical signal beam 335 is deflected from optics element 317 to port 311 to device 349. Another portion of optical signal beam 335 passes through optics element 317 and is then deflected from optics element 323 back to optics element 317. A portion of optical signal beam 335 is then deflected to port 309 to device 343.

In one embodiment, an optical signal beam 341 is transmitted from device 337 through port 307. Optical signal beam 341 is directed to and split by optics element 315. One portion of optical signal beam 341 is deflected to optics element 313, where one portion is deflected to port 303 to device 325 and another portion is deflected from optics element 319 back to optics element 313 to which a portion is directed to port 305 to device 331. Another portion of optical signal beam 341 passes through the optics element 315 to optics element 321. That portion is deflected back to optics element 315, through which a portion is deflected to optics element 317. A portion of optical signal beam 341 is deflected from optics element 317 to port 311 to device 349. Another portion of optical signal beam 341 passes through optics element 317 and is then deflected from optics element 323 back to optics element 317. A portion of optical signal beam 341 is then deflected to port 309 to device 343.

In one embodiment, an optical signal beam 347 is transmitted from device 343 through port 309. Optical signal beam 347 is directed to and split by optics element 317. One portion of optical signal beam 347 passes through the optics element 317 to port 311 to device 349. Another portion of optical signal beam 347 is deflected to optics element 323. That portion is deflected back to optics element 317, through which a portion is directed to optics element 315. One portion of optical signal beam 347 is deflected to optics element 321. That portion is deflected back to optics element 315, through which a portion is directed to port 307 to device 337. Another portion of optical signal beam 347 passes through the optics element 315 to optics element 313 where one portion is deflected to port 303 to device 325 and another portion is deflected from optics element 319 back to optics element 313 to which a portion is directed to port 305 to device 331.

In one embodiment, an optical signal beam 353 is transmitted from device 349 through port 311. Optical signal beam 353 is directed to and split by optics element 317. One portion of optical signal beam 353 passes through the optics element 317 to port 309 to device 343. Another portion of optical signal beam 353 is deflected to optics element 315. One portion of optical signal beam 353 is deflected to optics element 321. That portion is deflected back to optics element 315, through which a portion is directed to port 307 to device 337. Another portion of optical signal beam 353 passes through the optics element 315 to optics element 313 where one portion is deflected to port 303 to device 325 and another portion is deflected from optics element 319 back to optics element 313 to which a portion is directed to port 305 to device 331.

Thus, devices 325, 331, 337, 343 and 349 are optically coupled to one another through optical interconnection device 301 in accordance with the teachings of the present invention.

Figure 4:
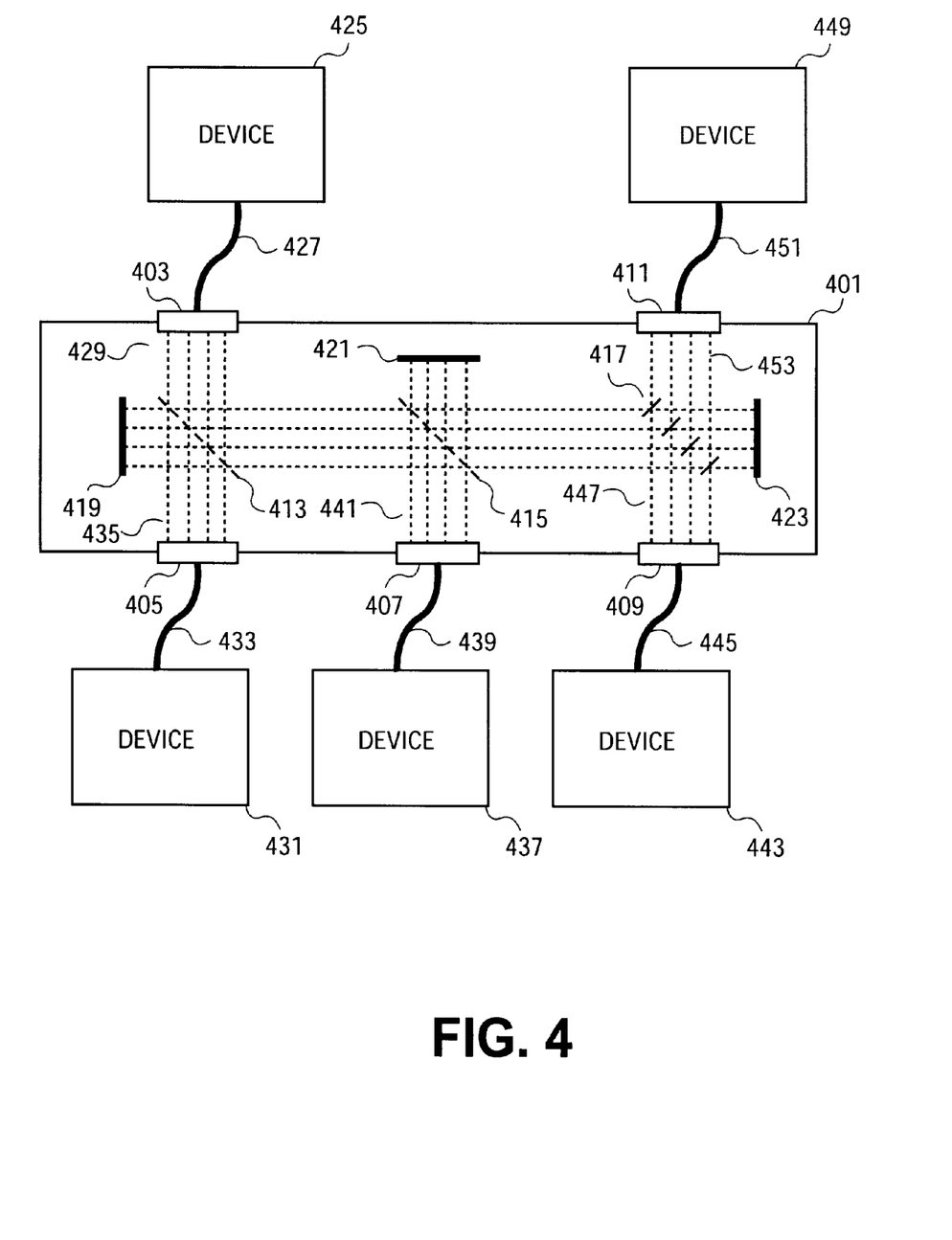
FIG. 4 is an illustration of one embodiment of an optical interconnection device providing a multi-bit multi-load optical bus for a plurality of devices in accordance with the teachings of the present invention.

FIG. 4 is an illustration of one embodiment of an optical interconnection device 401 providing a multi-bit multi-load optical bus for a plurality of devices 425, 431, 437, 443 and 449 in accordance with the teachings of the present invention. It is appreciated that the embodiment illustrated in FIG. 4 is similar to the embodiment illustrated in FIG. 3. As shown in FIG. 4, one embodiment of optical interconnection device 401 includes a plurality of ports 403, 405, 407, 409 and 411. In one embodiment, optics elements 413, 415, 417, 419, 421 and 423 are configured to optically couple ports 403, 405, 407, 409 and 411 to one another in a manner similar to that described in FIG. 3. As illustrated in the depicted embodiment, devices 425, 431, 437, 443 and 449 are coupled to ports 403, 405, 407, 409 and 411, respectively, through optical links 427, 433, 439, 445 and 451, respectively.

In one embodiment, devices 425, 431, 437, 443 and 449 generate optical signal beams 429, 435, 441, 447 and 453, respectively. In one embodiment, each one of optical signal beams 429, 435, 441, 447 and 453 include a plurality of N optical beams. In one embodiment, each one of the plurality of N optical beams represents one bit line of information of a bus. It is noted that each one of optical signal beams 429, 435, 441, 447 and 453 are illustrated in the embodiment shown in FIG. 4 as having N=4 optical beams. Thus, in this example, a four bit wide multi-load optical bus is provided by optical interconnection device 401. It is appreciated that in other embodiments, N may be greater than or less than 4 for wider or narrower buses.

In one embodiment, optical interconnection device 401 may be utilized in a multiprocessor system. For example, devices 425, 431, 443 and 449 may be CPUs and device 437 may be an input/output (I/O) controller. Such an embodiment may be utilized in high and server systems or the like. In such an embodiment, optical interconnection device 401 provides a multi-load optical bus for the CPUs and the I/O controller controls input and output operations to and from the CPUs. In another embodiment, one of the devices may be a CPU and the other devices may include other integrates circuit chips such as for example but not limited to I/O controllers, chipsets, bus controllers, memory chips, or the like.

Figure 5:
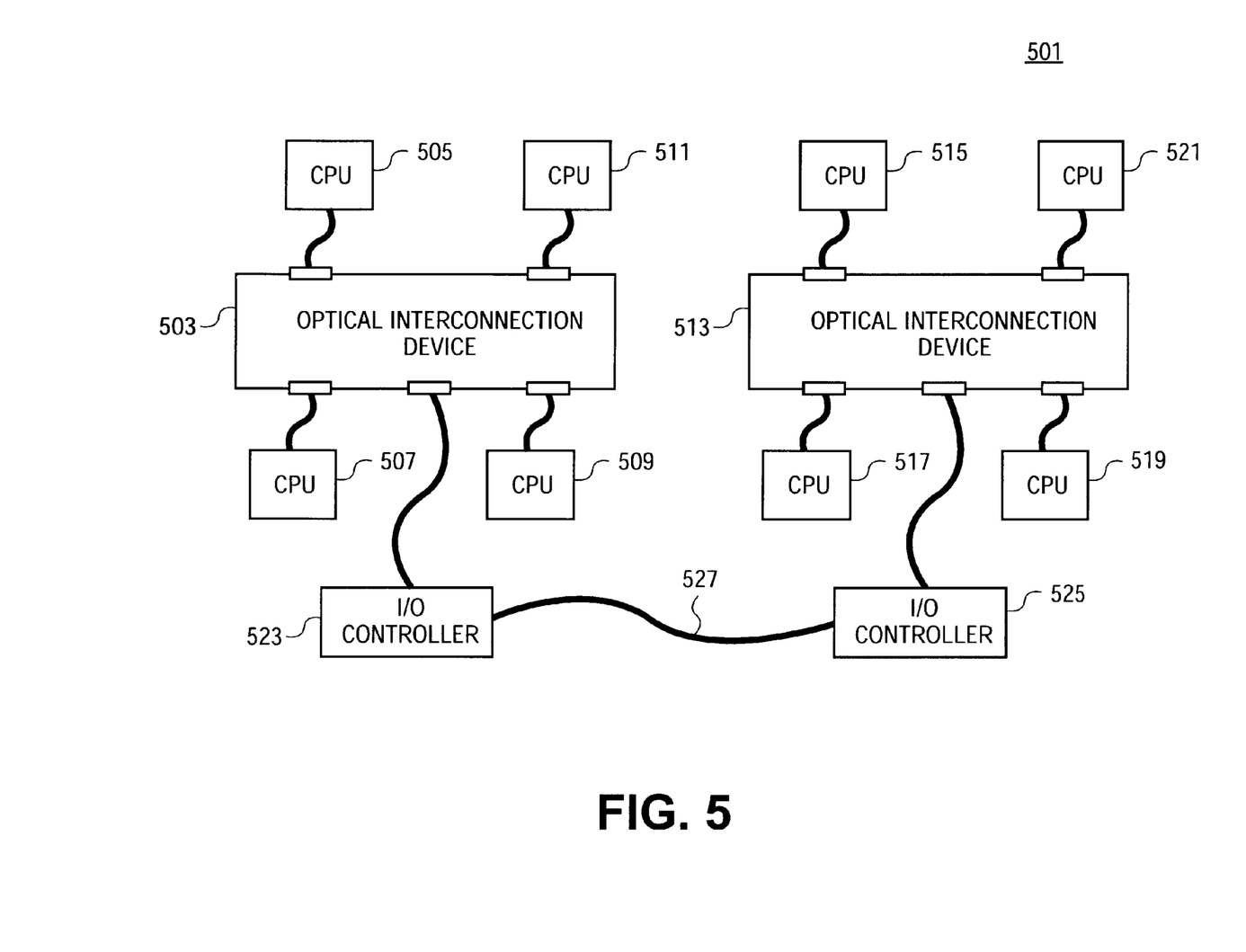
FIG. 5 is an illustration of one embodiment of a system including a plurality of servers having optical interconnection devices of the present invention coupled together through a point-to-point connection in accordance with the teachings of the present invention.

FIG. 5 is an illustration of one embodiment of a system 501 including a plurality of servers having optical interconnection devices 503 and 513 of the present invention coupled together through a point-to-point connection in accordance with the teachings of the present invention. As shown, system 501 includes optical interconnection device 503 optically coupling CPUs 505, 507, 509 and 511. In one embodiment, CPUs 505, 507, 509 and 511 form a multiprocessor server. In addition, system 501 includes optical interconnection device 513 optically coupling CPUs 515, 517, 519 and 521. In one embodiment, CPUs 515, 517, 519 and 521 form another multi-processor server. In one embodiment, optical interconnection devices 503 and 513 are similar to the optical interconnection devices illustrated in FIGS. 3 and/or 4.

As depicted in the embodiment illustrated in FIG. 5, I/O controller 523 is optically coupled to optical interconnection device 503 and I/O controller 525 is optically coupled to optical interconnection device 513. In one embodiment, I/O controller 523 controls input to and output from the bank of CPUs optically coupled to optical interconnection device 503. In one embodiment, I/O controller 513 controls input to and output from the bank of CPUs optically coupled to optical interconnection device 513.

As illustrated in FIG. 5, I/O controller 523 is coupled to I/O controller 525 through a point-to-point link 527. In one embodiment, point-to-point link 527 is an electrical link. In another embodiment, point-to-point link 527 is an optical link. Thus, another aspect of the present invention is that the presently described optical interconnection devices can be chained or coupled together to optically couple a plurality of devices.

Figure 6:
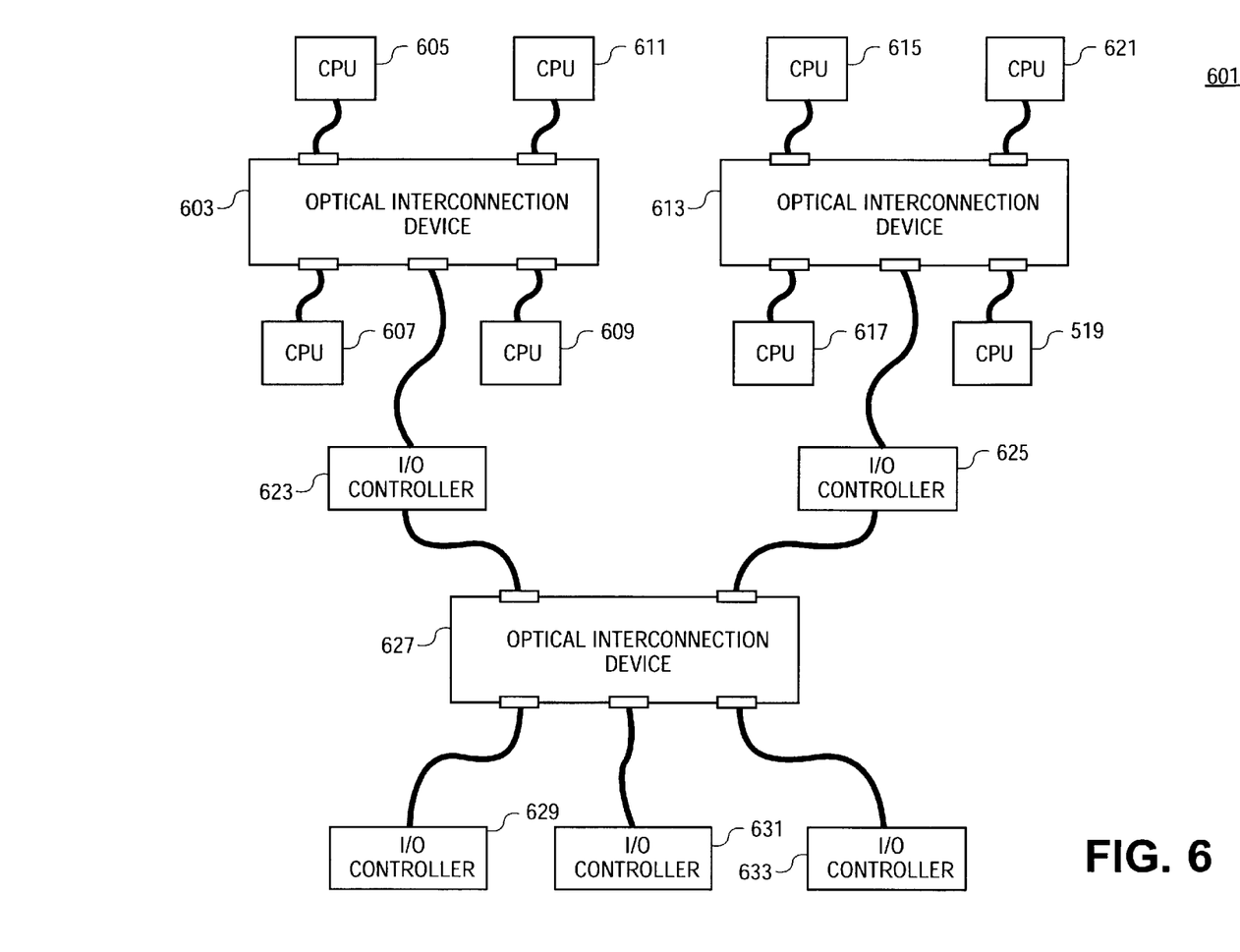
FIG. 6 is an illustration of one embodiment of a system including a plurality of servers having optical interconnection devices of the present invention coupled together through an optical interconnection device in accordance with the teachings of the present invention.

FIG. 6 is an illustration of another embodiment of a system 601 including a plurality of servers having optical interconnection devices 603 and 613 of the present invention coupled together through a an optical interconnection device 627 in accordance with the teachings of the present invention. As shown, system 601 includes optical interconnection device 603 optically coupling CPUs 605, 607, 609 and 611. In addition, system 601 includes optical interconnection device 613 optically coupling CPUs 615, 617, 619 and 621. In one embodiment, optical interconnection devices 603 and 613 are similar to the optical interconnection devices illustrated in FIGS. 3 and/or 4.

As depicted in the embodiment illustrated in FIG. 6, I/O controller 623 is optically coupled to optical interconnection device 603 and I/O controller 625 is optically coupled to optical interconnection device 613. In one embodiment, I/O controller 623 controls input to and output from the bank of CPUs optically coupled to optical interconnection device 603. In one embodiment, I/O controller 613 controls input to and output from the bank of CPUs optically coupled to optical interconnection device 613.

As illustrated in FIG. 6, I/O controller 623 is coupled to I/O controller 625 through a optical interconnection device 627. As shown in FIG. 6, additional I/O controllers 629, 631 and 633 may also be optically coupled to the other available ports on optical interconnection device 627. In one embodiment, additional I/O controllers 629, 631 and 633 are coupled to other devices (not shown), which may be coupled to optical interconnection device 627. Thus, and even greater number of banks of CPUs, chips, computer servers, computer systems or other optical interconnection devices may be optically coupled to the system 601 in accordance with teachings of the present invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for optically interconnecting a plurality of devices, comprising:
    splitting a first optical signal beam received from a first device;
    optically coupling a second device and a third device to receive the first optical signal beam;
    splitting a second optical signal beam received from the second device;
    optically coupling the first device and the third device to receive the second optical signal beam;
    splitting a third optical signal beam received from the third device;
    optically coupling the first device and the second device to receive the third optical signal beam; and
    deflecting a portion of at least one of the first, second, and third optical signal beams directed from a first beam splitter back to the first beam splitter.

2. The method for optically interconnecting the plurality of devices of claim 1 further comprising:
    splitting a fourth optical signal beam received from a fourth device;
    optically coupling the first device, the second device, the third device and a fifth device to receive the fourth optical signal beam;
    splitting a fifth optical signal beam received from the fifth device;
    optically coupling the first device, the second device, the third device and the fourth device to receive the fifth optical signal beam; and
    optically coupling the fourth and fifth devices to receive the first, second and third optical signal beams.

3. The method for optically interconnecting the plurality of devices of claim 1 further comprising deflecting the second optical signal beam back to the first beam splitter such that the third device is optically coupled to receive the second optical signal beam.

4. The method for optically interconnecting the plurality of devices of claim 2 further comprising deflecting the third optical signal beam back to a second beam splitter such that the fourth and fifth devices are optically coupled to receive the third optical signal beam.

5. The method for optically interconnecting the plurality of devices of claim 2 further comprising deflecting the fourth optical signal beam back to a third beam splitter such that the first, second and third devices are optically coupled to receive the fourth optical signal beam.

6. The method of claim 1 wherein at least one of the first, second and third devices comprise an integrated circuit chip.

7. The method of claim 1 wherein at least one of the first, second and third devices comprise a computer system.

8. The method of claim 1 wherein the first optical signal beam comprises a plurality of optical beams, each one of the plurality of optical beams to carry one bit line of information of a bus.

9. An optical interconnection device, comprising:
    a first optical input/output (I/O) port, the first optical I/O port to be optically coupled to a first device, the first optical I/O port to receive a first optical signal beam from the first device;
    a second optical I/O port optically coupled to the first optical I/O port, the second optical I/O port to be optically coupled to a second device, the second optical I/O port to receive a second optical signal beam from the second device, the first optical signal beam to be transmitted to the second device through the second optical I/O port, the second optical signal beam to be transmitted to the first device through the first optical I/O port; and
    a third optical I/O port optically coupled to the first and second optical I/O ports, the third optical I/O port to be optically coupled to a third device, the third optical I/O port to receive a third optical signal beam from the third device, the first and second optical signal beams to be transmitted to the third device through the third optical I/O port, the third optical signal beam to be transmitted to the first and second devices through the first and second optical I/O ports, respectively; and
    a first optical element optically coupled to a second optical element, the second optical element configured to deflect a portion of at least one of the first, second, and third optical signal beams directed from the first optical element back to the first optical element.

10. The optical interconnection device of claim 9 further comprising:
    a fourth optical I/O port optically coupled to the first, second and third optical I/O ports, the fourth optical I/O port to be optically coupled to a fourth device, the fourth optical I/O port to receive a fourth optical signal beam from the fourth device, the first, second and third optical signal beams to be transmitted to the fourth device through the fourth optical I/O port, the fourth optical signal beam to be transmitted to the first, second and third devices through the first, second and third optical I/O ports, respectively; and
    a fifth optical I/O port optically coupled to the first, second, third and fourth optical I/O ports, the fifth optical I/O port to be optically coupled to a fifth device, the fifth optical I/O port to receive a fifth optical signal beam from the fifth device, the first, second, third and fourth optical signal beams to be transmitted to the fifth device through the fifth optical I/O port, the fifth optical signal beam to be transmitted to the first, second, third and fourth devices through the first, second, third and fourth optical I/O ports, respectively.

11. The optical interconnection device of claim 9 wherein at least one of the first, second and third devices comprise an integrated circuit chip.

12. The optical interconnection device of claim 9 wherein at least one of the first, second and third devices comprise a computer system.

13. The optical interconnection device of claim 9 wherein the first optical signal beam comprises a plurality of optical beams, each one of the plurality of optical beams to carry one bit line of information of a bus.

14. An optical interconnection device, comprising:
   first, second and third optical input/output (I/O) ports;
   a first optics element optically coupled to the first, second and third optical I/O ports, the first optics element to receive a first optical signal beam from the first optical I/O port, the first optics element to separate the first optical signal beam into first and second portions of the first optical signal beam, the first portion of the first optical signal beam to be received by the second optical I/O port, the second portion of the first optical signal beam to be received by the third optical I/O port; and
   a second optics element optically coupled to the first optics element, the second optics element to deflect an optical beam directed from the first optics element back to the first optics element;
   a fourth optical I/O port;
   a third optics element optically coupled to the first optics element and the third and fourth optical I/O ports, the third optics element to receive the second portion of the first optical signal beam from the first optics element, the third optics element to separate the second portion of the first optical signal beam into first and second portions of the second portion of the first optical signal beam, the first portion of the second portion of the first optical signal beam to be received by the third optical I/O port, the second portion of the second portion of the first optical signal beam to be received by the fourth optical I/O port; and
   a fourth optics element optically coupled to the third optics element, the fourth optics element to deflect an optical beam directed from the third optics element back to the third optics element.

15. The optical interconnection device of claim 14 further comprising:
   a fifth optical I/O port;
   a fifth optics element optically coupled to the third optics element and the fourth and fifth optical I/O ports, the fifth optics element to receive the second portion of the second portion of the first optical signal beam from the third optics element, the fifth optics element to separate the second portion of the second portion of the first optical signal beam into first and second portions of the second portion of the second portion of the first optical signal beam, the first portion of the second portion of the second portion of the first optical signal beam to be received by the fourth optical I/O port, the second portion of the second portion of the second portion of the first optical signal beam to be received by the fifth optical I/O port; and
   a sixth optics element optically coupled to the fifth optics element, the sixth optics element to deflect an optical beam directed from the fifth optics element back to the fifth optics element.

16. The optical interconnection device of claim 15 wherein the first optics element is to receive a second optical signal beam from the second optical I/O port, the first optics element to separate the second optical signal beam into first and second portions of the second optical signal beam, the first portion of the second optical signal beam to be received by the first optical I/O port, the second portion of the second optical signal beam to be deflected from the second optics element back to the first optics element, and then a portion of the second portion of the second optical signal beam is to be directed the third optical I/O port.

17. The optical interconnection device of claim 16 wherein the third optics element is to receive a third optical signal beam from the third optical I/O port, the third optics element to separate the third optical signal beam into first and second portions of the third optical signal beam, the first portion of the third optical signal beam to be received by the first optics element, the second portion of the third optical signal beam to be deflected from the fourth optics element back to the third optics element, and then a portion of the second portion of the third optical signal beam is to be directed to the fourth optical I/O port.

18. The optical interconnection device of claim 17 wherein the fifth optics element is to receive a fourth optical signal beam from the fourth optical I/O port, the fifth optics element to separate the fourth optical signal beam into first and second portions of the fourth optical signal beam, the first portion of the fourth optical signal beam to be received by the fifth optical I/O port, the second portion of the fourth optical signal beam to be deflected from the sixth optics element back to the fifth optics element, and then a portion of the second portion of the fourth optical signal beam is to be directed to the third optics element.

19. The optical interconnection device of claim 18 wherein the fifth optics element is to receive a fifth optical signal beam from the fifth optical I/O port, the fifth optics element to separate the fifth optical signal beam into first and second portions of the fifth optical signal beam, the first portion of the fifth optical signal beam to be received by the fourth optical I/O port, the second portion of the fifth optical signal beam to be directed to the third optics element.

20. The optical interconnection device of claim 14 wherein at least one of the first, second and third optical I/O ports are configured to be optically coupled to an integrated circuit chip.

21. The optical interconnection device of claim 14 wherein at least one of the first, second and third optical I/O ports are configured to be optically coupled to a computer system.

22. The optical interconnection device of claim 14 wherein the first optical signal beam comprises a plurality of optical beams, each one of the plurality of optical beams to carry one bit line of information of a bus.

23. A system, comprising:
   a first optical interconnection device having a plurality of optical input/output (I/O) ports, each one of the plurality of optical I/O ports of the first optical interconnection device coupled to one another, the first optical interconnection device including first and second optical elements, the first optical element optically coupled to at least first, second and third optical I/O ports of the plurality of optical I/O ports, the second optical element optically coupled to the first optical element, the second optical element to deflect an optical beam directed from the first optical element back to the first optical element;

a first I/O controller coupled to one of the plurality of optical I/O ports of the first optical interconnection device;

a second optical interconnection device having a plurality of optical I/O ports, each one of the plurality of optical I/O ports of the second optical interconnection device coupled to one another; and a second I/O controller coupled to one of the plurality of optical I/O ports of the second optical interconnection device, the first and second I/O controller coupled to one another to provide a link between the first and second optical interconnection devices.

24. The system of claim 23 wherein the first and second I/O controllers are electrically coupled.

25. The system of claim 23 wherein the first and second I/O controllers are optically coupled.

26. The system of claim 23 further comprising a third optical interconnection device having a plurality of optical I/O ports, each one of the plurality of optical I/O ports of the third optical interconnection device coupled to one another, the first I/O controller optically coupled to a first one of the plurality of optical I/O ports of the third optical interconnection device, the second I/O controller optically coupled to a second one of the plurality of optical I/O ports of the third optical interconnection device.

* * * * *